US007017187B1

(12) United States Patent
Marshall et al.

(10) Patent No.: US 7,017,187 B1
(45) Date of Patent: Mar. 21, 2006

(54) METHOD AND SYSTEM FOR FILE BLOCKING IN AN ELECTRONIC MESSAGING SYSTEM

(75) Inventors: John W. Marshall, Montclair, NJ (US); Rob Ampaw, Jersey City, NJ (US); Dan Finucane, Bloomfield, NJ (US)

(73) Assignee: Citigroup Global Markets, Inc., New York, NY (US)

( * ) Notice: Subject to any disclaimer, the term of this patent is extended or adjusted under 35 U.S.C. 154(b) by 756 days.

(21) Appl. No.: 09/749,742

(22) Filed: Dec. 28, 2000

Related U.S. Application Data

(60) Provisional application No. 60/212,679, filed on Jun. 20, 2000.

(51) Int. Cl.
*G06F 11/30* (2006.01)
(52) U.S. Cl. .......................... 726/24; 726/22; 726/23; 713/188
(58) Field of Classification Search ................ 713/188, 713/200–201; 709/206, 220–221
See application file for complete search history.

(56) References Cited

U.S. PATENT DOCUMENTS

| | | | | |
|---|---|---|---|---|
| 5,414,833 | A | | 5/1995 | Hershey et al. ............. 395/575 |
| 5,440,723 | A | | 8/1995 | Arnold et al. .............. 395/181 |
| 5,623,600 | A | | 4/1997 | Ji et al. .................. 395/187.01 |
| 5,832,208 | A | | 11/1998 | Chen et al. ............ 395/187.01 |
| 5,889,943 | A | | 3/1999 | Ji et al. .................. 395/187.01 |
| 5,960,170 | A | | 9/1999 | Chen et al. ............ 395/183.14 |
| 6,058,168 | A | | 5/2000 | Braband .................. 379/93.24 |
| 6,065,043 | A | | 5/2000 | Domenikos et al. ........ 709/216 |
| 6,269,456 | B1 | * | 7/2001 | Hodges et al. ................ 714/38 |
| 6,728,886 | B1 | * | 4/2004 | Ji et al. ....................... 713/201 |
| 6,757,830 | B1 | * | 6/2004 | Tarbotton et al. ........... 713/188 |

FOREIGN PATENT DOCUMENTS

| | | |
|---|---|---|
| JP | 11-134190 | 5/1999 |
| JP | 11-167533 | 6/1999 |
| JP | 11-224190 | 8/1999 |

OTHER PUBLICATIONS

Zeichick, A., Content Security—Keep Your Users Safe ... And Focused—Three software packages aim to keep your employee's eyes front and center, Apr. 17, 2000, InternetWeek, pp. 1-7.*
The University of Texas at Austin Chooses CA's InoculateIT to Protect Web Environment Against Virus Attacks, Mar. 22, 2000 M2 Presswire, pp. 1-4.*
Komiega, K., Storage product prevents virus attacks, May 30, 2000, SearchStorage, pp. 1-5.*
Drips, M., Pair of Products E-mail And Attachments, Feb. 1997, InfoWorld, Retrieved from the Internet on May 13, 2005:<URL: http://proquest.umi.com/pqdweb?index=0 &did=11037315&SrchMode=1&sid=1&Fmt=4 &VInst=PROD&VType=PQD&RQT>.*
International Application Published Under the PCT by WIPO, International Bureau on Mar. 12, 1998, International Publication No. WO 98/10342.

(Continued)

*Primary Examiner*—Gilberto Barrón, Jr.
*Assistant Examiner*—Minh Dinh
(74) *Attorney, Agent, or Firm*—George T. Marcou; Kilpatrick Stockton LLP

(57) ABSTRACT

The invention provides a method and system for quickly and preemptively controlling the outbreak of destructive software applications sent in an electronic messaging system. Such system and method provide an additional component to an electronic messaging system to detect and block possible malicious applications in attachments of electronic messages. The additional component can be customized to suit the electronic messaging system and reconfigured to accommodate future virus threats.

12 Claims, 3 Drawing Sheets

OTHER PUBLICATIONS (Article) Copeland, "Organizations face holiday e-mail attachment deluge—Proper policies, tools needed to prevent network delays and virus transmission" *Computerworld*, vol. 33, No. 51, p. 56, Dec. 1999.

(Article) Roberts, et al.. "First line of defense—Antivirus gateways can help you stop the spread of Internet-borne viruses before viruses stop your network," *PC Magazine-Network Edition*, vol. 16, No. 7, pp. NE1-NE13, Apr. 1997.

(Article) Sengstack, "Make your PC hacker-proof," *PC World*, vol. 18, No. 9, p. 169, Sep. 2000.

(Article) Krebs, "Resume' virus impact negligible, but new threats emerge," *Newsbytes*, NA, May 30, 2000.

(Article) Savage, "Outlook gets new security features to combat viruses," *Computer Reseller News*, No. 32, May 22, 2000.

(Article) Creed, "Microsoft issues patch for outlook in wake of love bug," *Newsbytes*, NA, May 16, 2000.

(Article) Chernicoff "Stop network attacks (tools for stopping computer viruses)," *Windows Sources*, vol. 5, No. 7, p. 157, Jul. 1997.

(Brief Article Product Announcement) ELMA 1.0 from GROUP.

* cited by examiner

METHOD AND SYSTEM FOR FILE BLOCKING IN AN ELECTRONIC MESSAGING SYSTEM

This application claims the benefit of U.S. Provisional Application No. 60/212,679 titled "METHOD AND SYSTEM FOR FILE BLOCKING IN AN ELECTRONIC MESSAGING SYSTEM", filed Jun. 20, 2000, which is herein incorporated by reference in its entirety.

BACKGROUND OF THE INVENTION

1. Field of the Invention

The present invention relates to the field of computer security and integrity within an electronic messaging environment, and in particular, to a system and method for controlling damage caused by and for containing the spread of software viruses, worms, or other destructive applications in an electronic messaging system.

2. Description of the Related Art

Electronic messaging began in the early 1970s during the development of the Advanced Research Projects Agency Network (ARPANET), a computer networking project funded by the United States government, designed to share computing, and the predecessor of today's Internet. At the outset, electronic messaging was not even contemplated as a potential application for ARPANET, though Ray Tomlinson's e-mail system would soon become the biggest use of ARPANET.

Early e-mail systems provided little more than a mechanism for exchanging text messages. If a user wished to exchange binary files such as executable applications, he or she would use the File Transfer Protocol (FTP). As the use of e-mail grew, network users began to develop ways to send files as attachments; however, e-mail systems were not well suited for transporting binary data because some binary files contained characters or control sequences that confused the e-mail transport and delivery systems. This prompted the development of programs such as "uuencode" that could convert binary files into text files that could then be sent within e-mails.

Over the years, e-mail systems have evolved to become more attuned to the demands of users, making common tasks easier to accomplish and creating complex systems that can be customized for the particular demands of an individual or company. For example, one of the most common tasks a user encounters is entering the recipients (e.g., destination addresses) of e-mail messages. The present version of Microsoft Outlook eases the task by including a directory of e-mail users and includes a Visual Basic extension that permits developers to create customized e-mail applications.

Along with the flexibility of modern e-mail systems comes added risks. Using modern e-mail clients such as Microsoft Outlook, users can send applications as attachments to e-mail messages. By making it easy for users to execute attached applications, modern electronic messaging systems prove easy targets for malicious applications such as electronic viruses, worms, and other destructive programs. The terms "virus" and "worm" are used herein to generically refer to those malicious applications and destructive programs.

A recent outbreak that took the world by storm was the "I Love You" worm. This Visual Basic code, when executed, looks through a user's address book and sends an e-mail message with a copy of the worm to each user in that address book. The worm spread rapidly, clogging e-mail servers throughout the world and forcing large corporations to shut down e-mail servers for an entire day. Network Associates, a major provider of anti-virus, network security and management software, estimates that the worm caused approximately $6.7 billion in damages throughout the world.

Once a virus has been identified, there are many anti-virus applications that can help enterprises detect and prevent outbreaks; however, when a new virus is released, users are vulnerable until the new virus has been analyzed and incorporated into the virus databases of the anti-virus applications.

Conventional anti-virus software scans e-mail attachments looking for applications that match a virus fingerprint. It can take hours before a fingerprint can be determined, tested, and then made available to anti-virus software customers and if Internet access is adversely impacted by a virus, then it may be extremely difficult to download the anti-virus software update.

BRIEF SUMMARY OF THE INVENTION

Thus, there is a need for a method and system for quickly and preemptively containing and controlling the outbreak of destructive software applications sent in an electronic messaging system. There is also a need for software that can contain the spread of a virus until anti-virus software can be updated to handle a new virus infestation.

Accordingly, the preferred embodiments of the present invention provide a system and method for quickly and preemptively controlling the outbreak of destructive software applications sent in an electronic messaging system.

The preferred embodiments of the present invention also provide a system and method for containing the spread of viruses until virus software can be updated to handle a new virus infestation.

The preferred embodiments of the present invention further provide a system and method for detecting electronic viruses and worms in attachments of electronic messages in an electronic messaging system, wherein the system and method include an add-in to the electronic messaging system to monitor incoming or outgoing electronic messages.

The preferred embodiments of the present invention also provide a system and method for an add-in to an electronic messaging system to detect electronic viruses and worms in electronic messages, wherein the add-in can be configured to suit the electronic messaging system and reconfigured to accommodate future virus threats.

BRIEF DESCRIPTION OF THE DRAWINGS

The preferred embodiments are illustrated by way of example and not limitation in the following figures, in which.

DETAILED DESCRIPTION OF THE PREFERRED EMBODIMENTS OF THE INVENTION

The present invention solves the problems associated with prior art anti-virus software in containing the spread of software viruses propagated via an electronic mail system. The invention can be implemented as a software application as described below. In a preferred embodiment described below, the present invention is implemented as an add-in to Microsoft Outlook. One of ordinary skill in the art will appreciate that there are many additional embodiments that can be implemented in any electronic message client software package other than Microsoft Outlook using conventional software development techniques from the description that follows.

Figure 1:
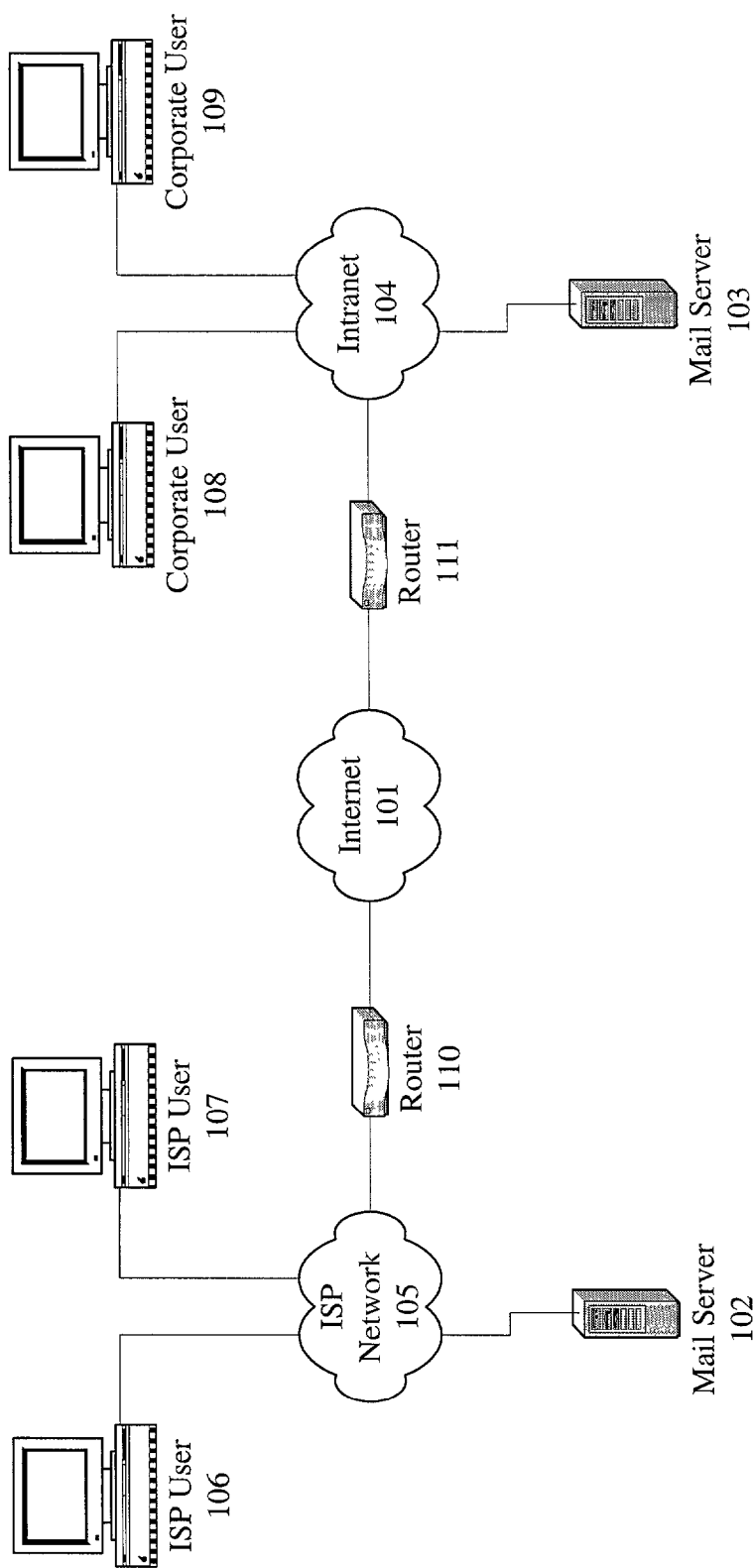
FIG. 1 depicts a schematic diagram of an electronic messaging system according to one embodiment of the present invention.

FIG. 1 depicts a network diagram according to one embodiment of the present invention. The diagram shows ISP Network 105 and Intranet 104 connected to the Internet 101 through Router 110 and Router 111. ISP Network 105 shows a network configuration of an Internet Service Provider (ISP). Users dial up to the ISP Network 105 to send and receive e-mail through Mail Server 102 and to access the Internet 101.

FIG. 1 also shows Intranet 104, a corporate intranet providing users access to local servers, such as mail server 103, as well as Internet 101 access. For example, Corporate User 108 and Corporate User 109 can use an electronic message client software such as Microsoft Outlook to send and receive e-mail through the Microsoft Exchange application running on Mail Server 103. This system also permits users to send and receive Internet e-mail. For example, Corporate User 108 can send an e-mail message to ISP User 106 and ISP User 107. The e-mail message is first transmitted to Mail Server 103. This server determines the messages destination and transmits the message to Mail Server 102. When ISP User 106 or ISP User 107 logs onto ISP Network 105, the users can access Mail Server 102 to retrieve the message sent from Corporate User 108. Although FIG. 1 depicts an Intranet 104 and an ISP Network 105 connected to the Internet 101, one of ordinary skill in the art will appreciate that two ISP networks, two Intranets, or multiple ISP networks and Intranets may be connected to the Internet 101 in the same fashion.

E-mail messages may simply contain text; however, they may also contain applications included as attachments. Using a conventional e-mail client software such as Microsoft Outlook, a user can easily execute an attached program by clicking on an icon associated with the attached program. If the attached program contains a virus, such as a worm or other malicious or destructive program, the user's computer can become infected and spread the virus or worm to other users.

A preferred embodiment of the present invention is implemented as a software application add-in to Microsoft Outlook/Exchange using programming source codes, which can be compiled using a conventional compiler, to generate an executable program module. According to the preferred embodiment, the add-in includes an implementation of a Microsoft Exchange client extension written in the C++ programming language and interfacing with Exchange Server through Microsoft's MAPI (Mail API) 1.0 API (Application Program Interface). The add-in includes a dynamic link library (DLL) application that performs file blocking of attached files that are suspected of carrying viruses or worms. Like many other DLLs, the add-in is written so that its routines are shared by more than one application at the same time. It provides protection against e-mail borne worms and viruses by removing the capability to open messages that may contain destructive programs or scripts. While the add-in does not remove the virus, it does render the virus harmless and prevents it from spreading within an Exchange Server Organization.

In the preferred embodiment of the present invention, the add-in DLL application is generated for Microsoft Outlook/Exchange. However, one of ordinary skill in the art will appreciate that the type of add-in depends on the type of electronic message client software being used. Thus, any executable program module that is functionally equivalent to a DLL may be generated according to the present invention to perform the same functions done by the add-in DLL application described herein.

Furthermore, one of ordinary skill in the art will appreciate that the source codes used to generate the add-in DLL application may be written and compiled in any known or future computer language format, other than C++, while retaining the same programming logic to generate the add-in DLL application in a Microsoft Outlook/Exchange environment or a compatible executable program module in a corresponding electronic message client software.

The add-in DLL application protects users of Outlook from newly introduced viruses. It may be used in conjunction with an anti-virus product and protects users of Outlook from a new virus before an update to the anti-virus product is available, downloaded, and installed. For instance, when a user executes an anti-virus software on his or her machine, the anti-virus software may call on the add-in DLL application to perform its file blocking functions.

According to an embodiment of the present invention, the behavior of the add-in is configurable. For example, if a new virus appears in the form of a destructive VBScript program named 'love-letter-for-you.txt.vbs', the add-in can be configured to stop users of Outlook from opening any message that contains an attachment with that name. The configuration is centralized at a host Exchange Server and once set it determines the policy for all users of Outlook within an entire Exchange Server Organization.

Figure 2:
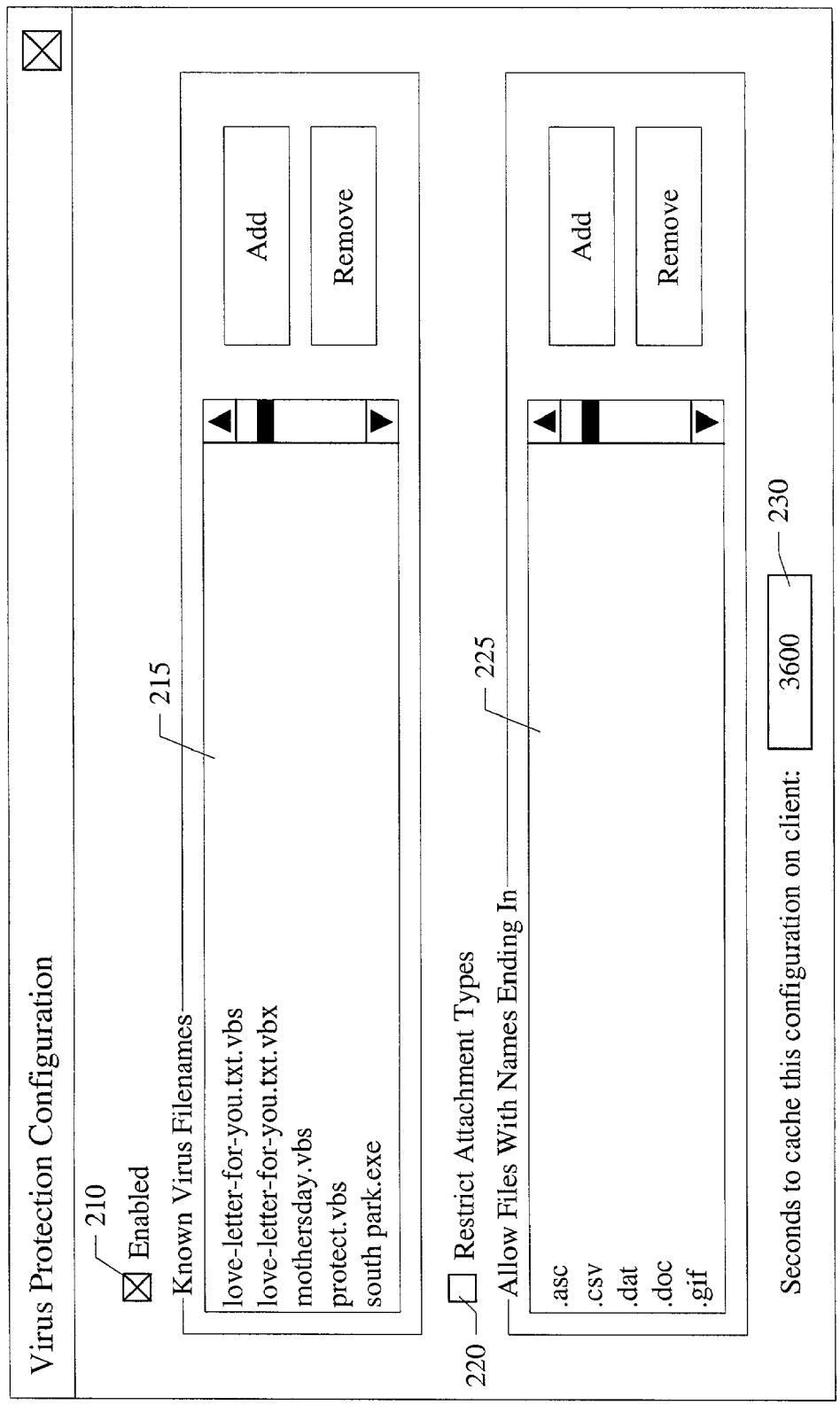
FIG. 2 illustrates an administrative graphical user interface for creating and maintaining the configuration of a system according to one embodiment of the present invention.

The add-in behavior is determined by its configuration that may be stored in a hidden message contained within a globally replicated public folder. If the user of Outlook is a member of an Exchange Server distribution list named, for example, 'Security Administrators', then a menu item named, for example, 'Security Configuration . . . ' is added to that user's Outlook menu. If this menu is selected, a screen such as that shown in FIG. 2 is displayed. The configuration changes made using this dialog are stored in the hidden message contained within the public folder. Prior to saving any changes to the configuration, the administrator may be warned that the configuration changes will effect the entire Exchange Server Organization and prompted to confirm such changes. One of ordinary skill in the art will appreciate that if an electronic message client software other than Microsoft Outlook is used, the add-in configuration may be stored in a hidden message contained within a globally replicated environment that is functionally equivalent to the public folder of Outlook.

According to an embodiment of the present invention, if the add-in is not enabled in box 210, the system does nothing. If the add-in is enabled by marking box 210, as shown in FIG. 2, it will not allow users of Outlook to open messages that contain attachments with names matching those listed in the 'Known Virus Filenames' list 215. If 'Restrict Attachment Types' is checked by marking box 220, it will not allow users of Outlook to open or insert an attachment unless its name ends with one of the filename extensions listed in 'Allow Files With Names Ending In' list 225. Alternatively, the list 225 may be a 'Restrict Files with Names Ending In' list, which contains file name extensions that may carry viruses or worms. Thus, a check in box 220 will restrict users of Outlook from opening files with such file name extensions.

Thus, the add-in configuration can block file types based on the extension, or trailing characters of the filename. For example, in one embodiment of the present invention, the configuration lists the allowed attachment types. One configuration permits users to only open files ending in, for instance, ".asc", ".csv", ".dat", ".doc", or ".gif" listed in 'Allow Files With Names Ending In'. No other attachments can be opened by a user. In another embodiment of the present invention, users are prohibited from opening files ending in specified extensions listed in 'Restrict Files With Names Ending In'. For example, users may be prohibited from opening executable files or files ending in ".vbx", ".exe", ".com", and ".vbs".

The value for 'Seconds to cache this configuration on client' determines how often the add-in will open up the hidden message in the public folder to refresh its configuration. A value of 3600 in box 230 means that the add-in refreshes its configuration at most once per hour. This caching insures that the add-in can be used in large Exchange Server installations.

Figure 3:
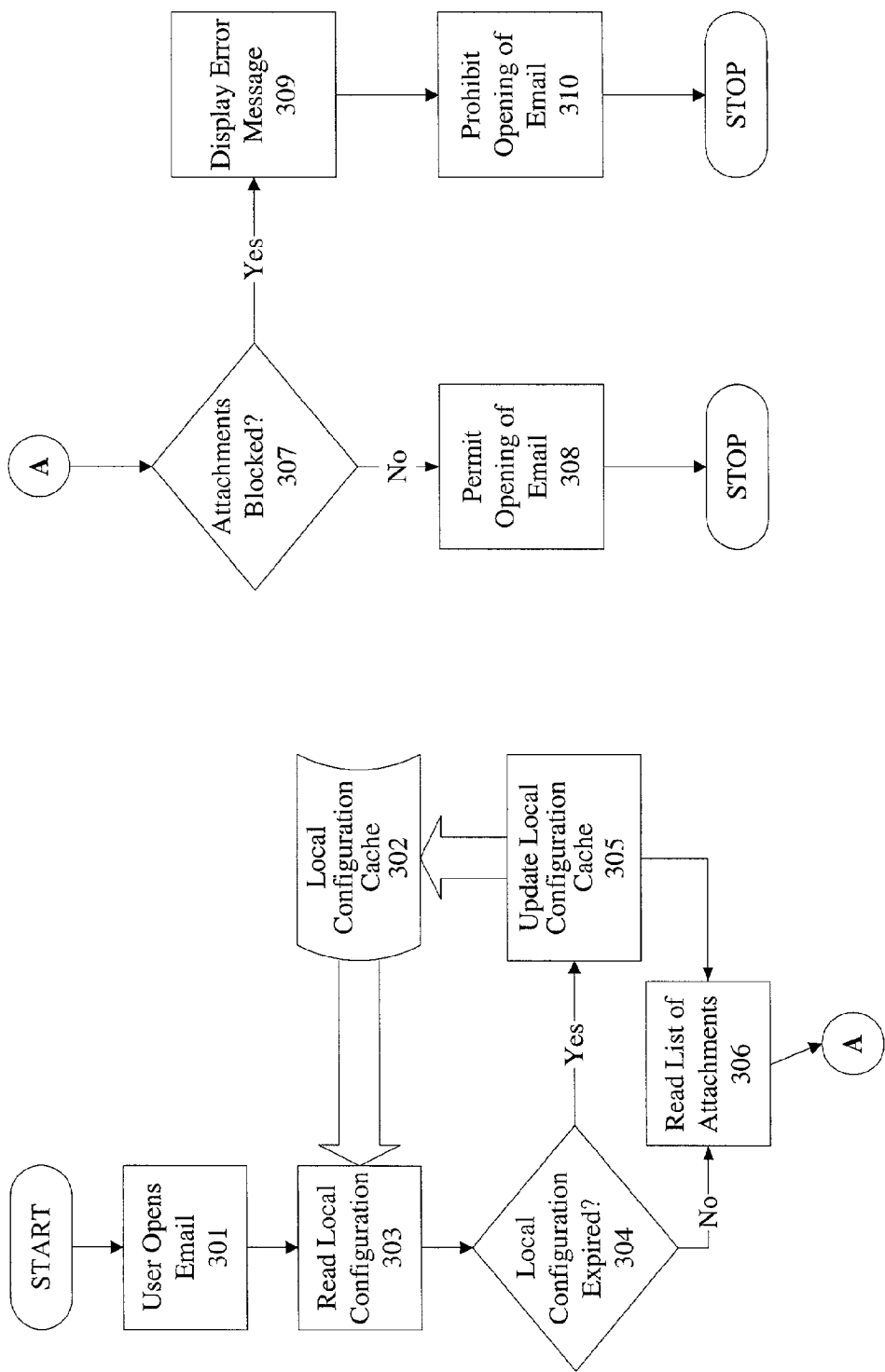
FIG. 3 is a flowchart describing a method for blocking identified files according to an embodiment of the present invention.

One embodiment of the present invention operates according to the flowchart shown in FIG. 3. A user, using a copy of Outlook containing an add-in according to the present invention, opens an e-mail message as shown in box 301. The add-in is activated and reads the local configuration cache 302 in box 303. The local cache includes the time that the cache was last updated and the number of seconds to cache the present configuration.

If the number of seconds since the configuration was last updated exceeds the number of seconds to cache the configuration, or if no configuration is presently cached, then the local configuration is expired in box 304. The system then updates the local configuration in box 305.

Next, the system reads the list of attachments in box 306 that are included in the e-mail that the user is trying to open. The filenames of the attachments are then compared to the configuration that is presently cached. The system checks to see if any of the attachment filenames match the "Known Virus Filenames" list in box 307. If one or more matches, then the attachments are blocked; an error message is displayed in box 309, and the user is prohibited from opening the e-mail message in box 310. Alternatively, the user is allowed to open the e-mail message but not any of its blocked attachments. According to an embodiment of the present invention, the displayed error message of box 309 may indicate that the user is not allowed to open the attachments and/or the Exchange e-mail system is in virus protection mode. Then the user may be prompted to contact the help desk for any questions. If the e-mail message does not contain a blocked file, then the user is allowed to open the e-mail in box 308.

The preferred embodiments described above in conjunction with the accompanying figures and source code are intended to be illustrative of how to practice the present invention. The present invention is not limited to these embodiments. One of ordinary skill in the art will understand that the present invention is applicable to any electronic messaging system where viruses and/or other malicious or destructive software can be transmitted. For example, viruses and/or malicious applications can be transmitted across a network to Personal Digital Assistants (PDAs), cell phones, pagers, or any other communication device. The present invention can also be used in any network system including, but not limited to, wireless, satellite, fiber optic, and cable networks.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

What is claimed is:

1. A method for detecting malicious applications in an electronic messaging environment, comprising:
   implementing a security software application in an electronic messaging system with connection to a data network;
   providing a local configuration of the security software application on a local messaging terminal, wherein the local configuration includes a list of at least one known malicious application;
   detecting a receipt of an electronic message sent to the local messaging terminal;
   determining whether the electronic message includes any attachment;
   upon the determining that an attachment is included with the electronic message, determining whether a time period since a last update of the local configuration has passed beyond a predetermined threshold period; and
   upon the determining that the time period since the last update of the local configuration has passed beyond the predetermined threshold period, updating the local configuration from a globally replicated public folder within the electronic messaging system.

2. The method of claim 1, wherein implementing a security software application on a local messaging terminal includes implementing an add-in software component to an electronic message client software of the electronic messaging system.

3. The method of claim 2, wherein the electronic message client software resides in a host server for the local messaging terminal.

4. The method of claim 1, wherein the security software application includes a dynamic link library (DLL) application.

5. The method of claim 1, further comprising:
   prompting an error message on the local messaging terminal when the attachment to the electronic message matches a name on the list of the at least one known malicious application.

6. The method of claim 5, further comprising:
   blocking the matched attachment from being opened or sent.

7. The method of claim 1, wherein the list of at least one known malicious application includes a list of known virus filenames.

8. The method of claim 1, wherein the local configuration of the security software application includes:
   an option to enable a checking of an attachment for any malicious application based on the list of at least one known malicious application;
   an option to add or remove a known malicious application from the list of at least one known malicious application; and
   an option to restrict an attachment type.

9. The method of claim 1, wherein the local configuration of the security software application includes an option to set a time for the desired periodic basis to refresh the local configuration.

10. The method of claim 1, wherein the list of at least one known malicious application comprises executable application types.

11. The method of claim 1, wherein the local configuration of the security software application includes an option to set a time for the desired periodic basis to refresh the local configuration.

12. The method of claim 1, further comprising:
   using the security software application to check the attachment for any malicious application based on the updated local configuration and the list of at least one known malicious application contained therein; and
   upon the determining that the time period since the last update of the local configuration has not passed beyond the predetermined threshold period, using the security software application to check the attachment for any malicious application based on the provided local configuration.

* * * * *

UNITED STATES PATENT AND TRADEMARK OFFICE
CERTIFICATE OF CORRECTION

PATENT NO. : 7,017,187 B1  Page 1 of 1
APPLICATION NO. : 09/749742
DATED : March 21, 2006
INVENTOR(S) : John W. Marshall, Rob Ampaw and Dan Finucane It is certified that error appears in the above-identified patent and that said Letters Patent is hereby corrected as shown below:

<u>Title page,</u>
Item [56], References Cited, OTHER PUBLICATIONS, change "Drips, M., Pair of Products E-mail and Attachments, Feb." to -- Drips, M., Pair of Products Protects E-mail and Attachments, Feb. --.

Signed and Sealed this

Twenty-seventh Day of June, 2006

JON W. DUDAS
*Director of the United States Patent and Trademark Office*